Feb. 3, 1953 G. A. ARVIDSON 2,627,324
HYDRAULIC POWER TRANSMISSION APPARATUS
Filed March 21, 1949 4 Sheets-Sheet 1
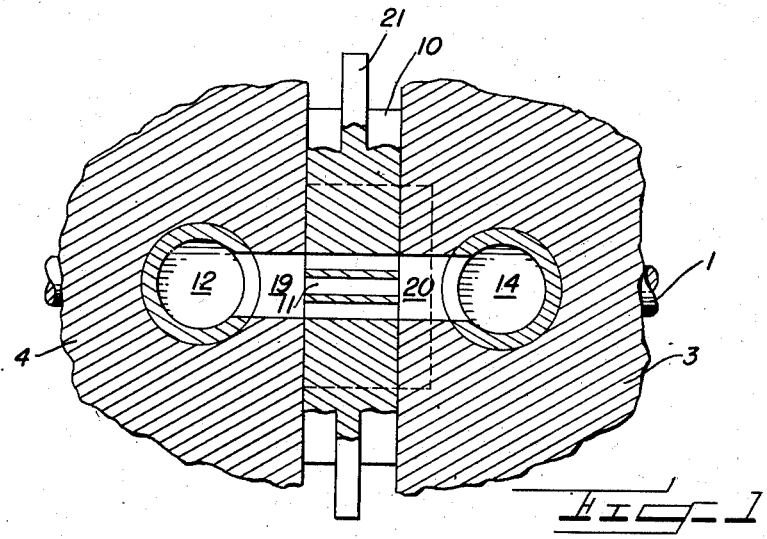
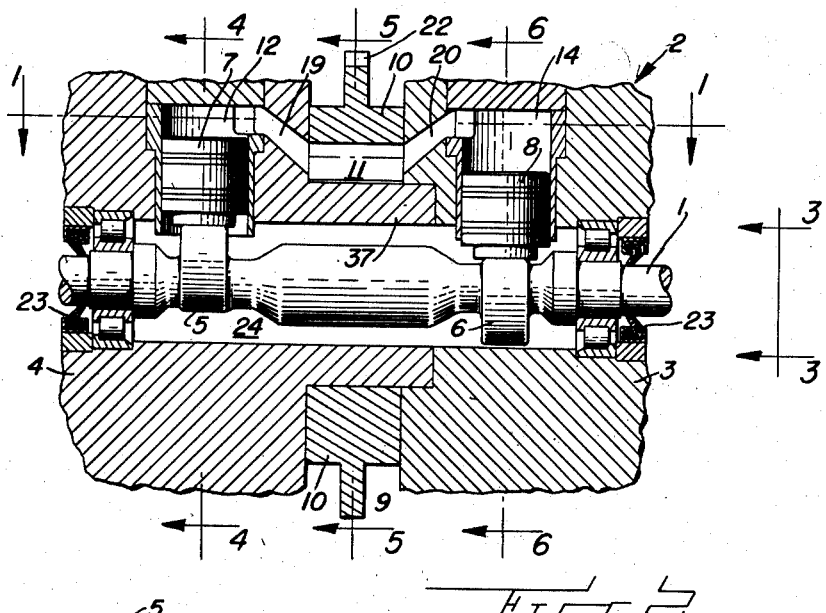
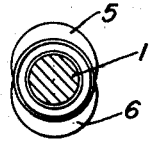
INVENTOR.
Gustaf Arthur Arvidson Feb. 3, 1953 G. A. ARVIDSON 2,627,324
HYDRAULIC POWER TRANSMISSION APPARATUS
Filed March 21, 1949 4 Sheets-Sheet 2
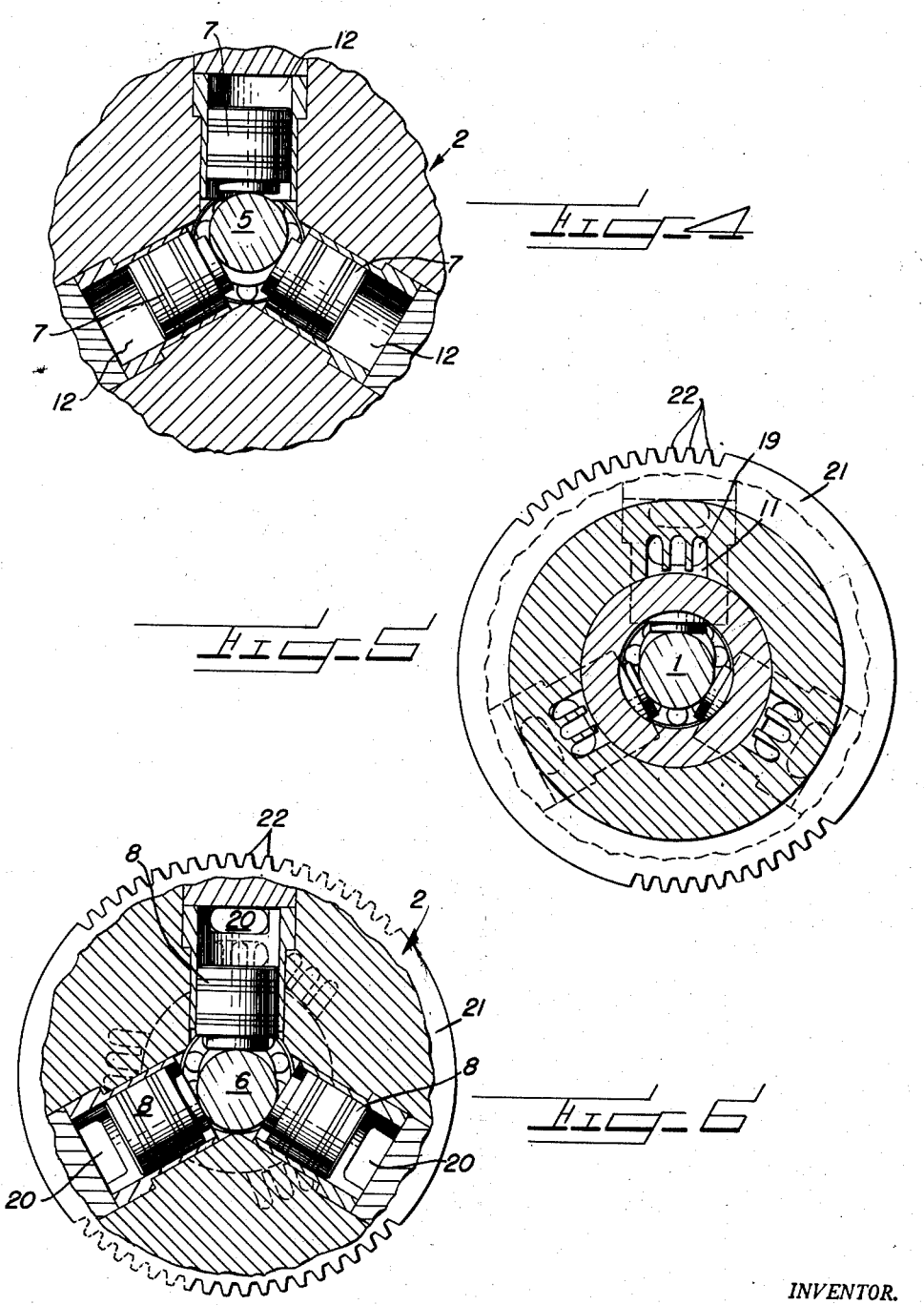
INVENTOR.
Gustaf Arthur Arvidson

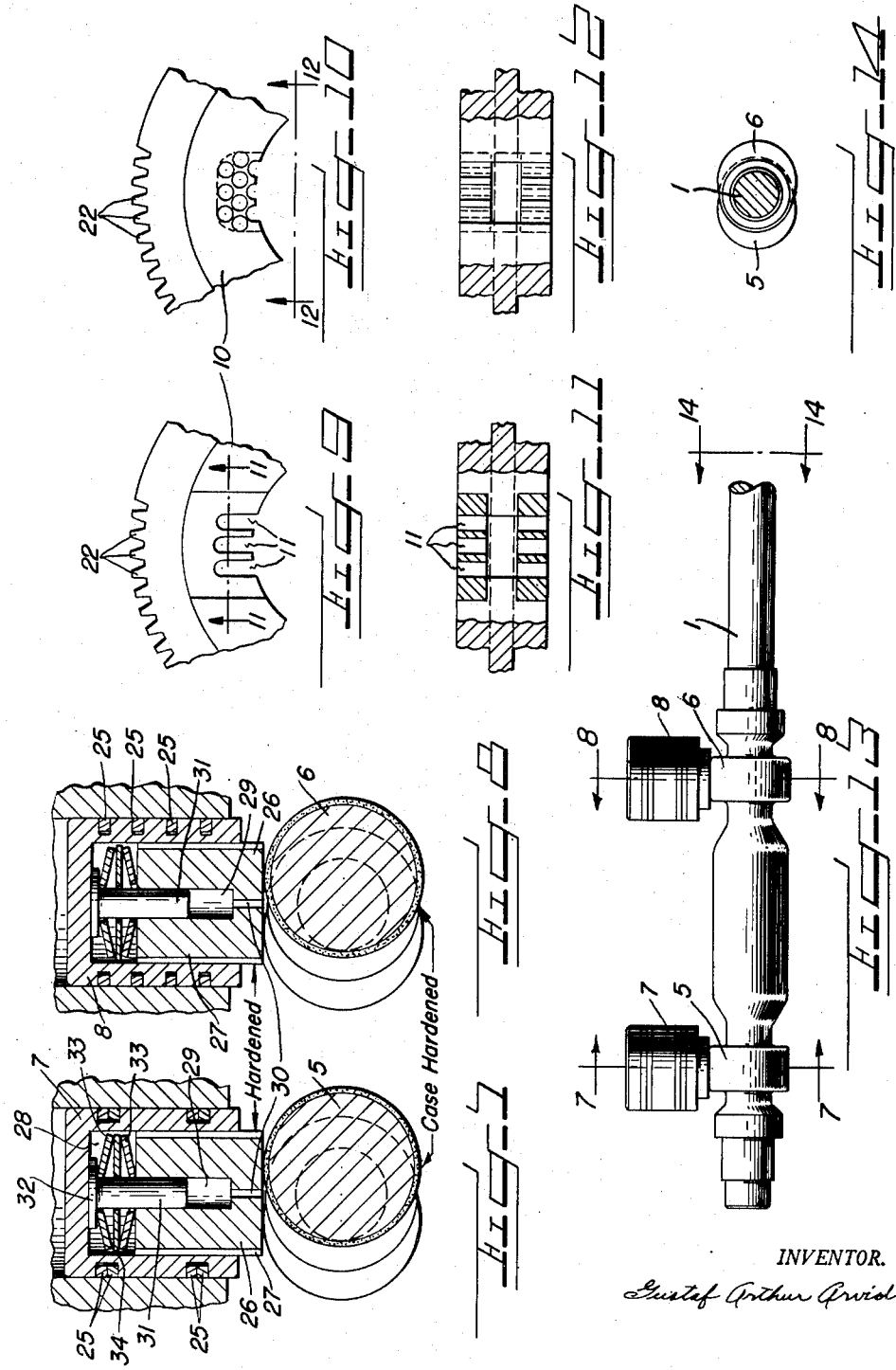

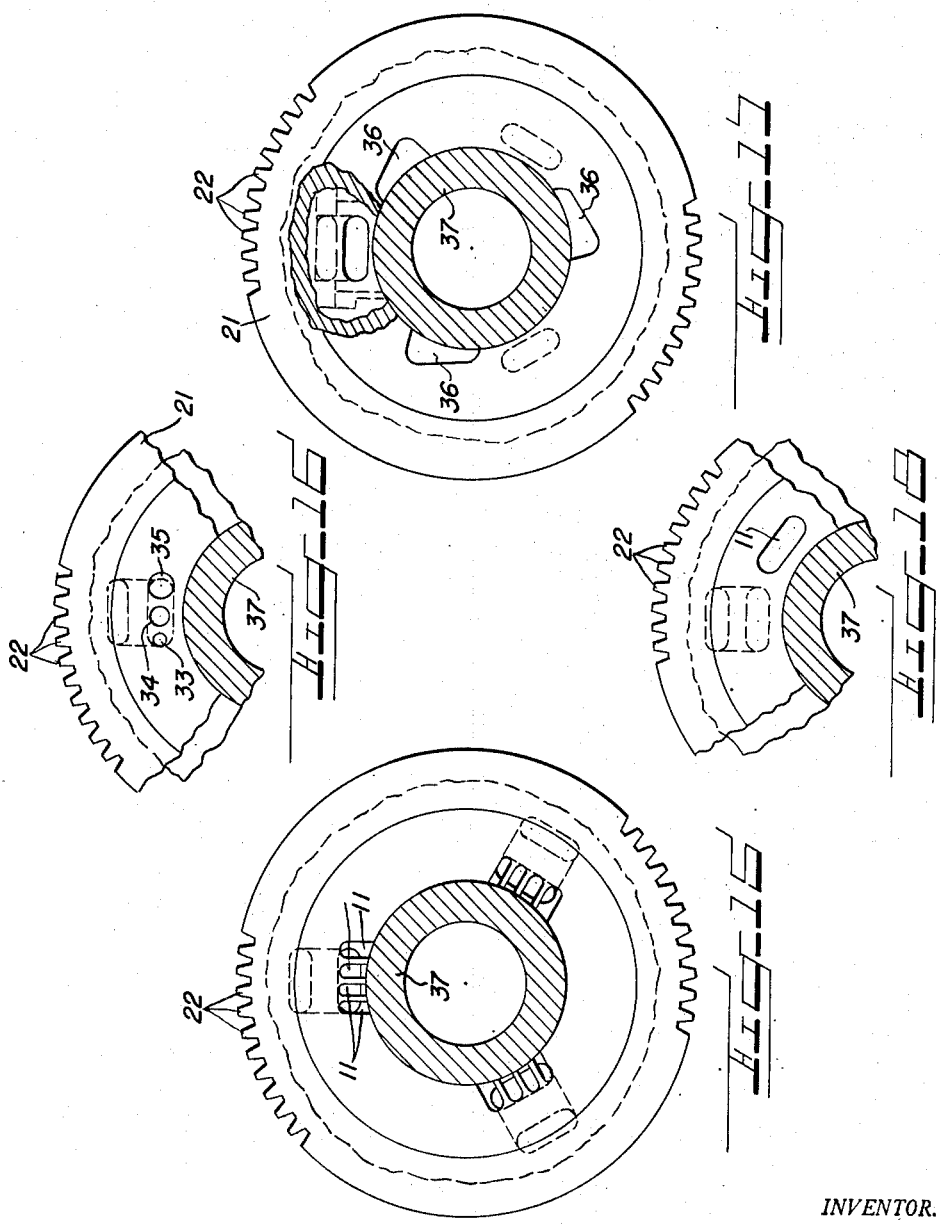

Patented Feb. 3, 1953

2,627,324

UNITED STATES PATENT OFFICE 2,627,324

HYDRAULIC POWER TRANSMISSION APPARATUS

Gustaf Arthur Arvidson, Davenport, Iowa

Application March 21, 1949, Serial No. 82,606

6 Claims. (Cl. 188—91)

My present invention relates to a hydraulic power transmission apparatus for use with a mechanism such as a hydraulic brake, dynamometer, clutch, fluid coupling, or hydraulic torque converting clutch transmission. Roughly speaking, the structure shown comprises a driving shaft or a driven shaft having a plurality of eccentrics constituting projections from the shaft and serving to actuate pistons in cylinders at a rate depending somewhat upon the resistance to the flow of a fluid from one cylinder to another in the same axial plane with relation to the axis of the shaft. Preferably, the cylinders are arranged radially with reference to the shaft and spaced around the shaft at a distance of one hundred twenty degrees (120°) in the same plane. Two cylinders in the same plane, in each instance, are connected by passageways for the flow of a fluid from one to the other and return, as the shaft rotates, and the eccentrics cause the pistons to alternate in their reciprocation. The passageways between the cylinders are open or restricted by rotating valve members surrounding the shaft and serving to open or close the passageways according to the amount of rotation of the movable valve member.

Among the objects of this invention are the provision of simple controlling means for regulating the speed of rotating shafts without the use of mechanical means producing wear upon the machine parts; the provision of a fluid brake of an improved type which will be subject to a minimum amount of wear; the provision of an improved type of dynamometer; the provision of an improved clutch; the provision of an improved coupling; the provision of an improved hydraulic brake; the provision of an improved torque converter; and such further objects, advantages, and capabilities as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 1 represents a longitudinal section substantially along the plane indicated by the line 1—1, Fig. 2;

Fig. 2 represents a longitudinal section of a fragmentary part of this construction, taken substantially along the medial plane of the structure shown in Fig. 1;

Fig. 3 represents a transverse section across the eccentric-carrying shaft in the direction of the arrows 3—3, Fig. 2;

Fig. 4 represents a transverse section across the structure of Fig. 2, looking in the direction of the arrows 4—4 in that figure;

Fig. 5 represents a transverse section substantially along the plane indicated by the line 5—5, Fig. 2;

Fig. 6 represents a fragmentary cross-section substantially along the plane indicated by the line 6—6, Fig. 2;

Fig. 7 represents a fragmentary transverse section substantially along the plane indicated by the line 7—7, Fig. 13;

Fig. 8 represents a transverse section substantially along the plane indicated by the line 8—8, Fig. 13;

Fig. 9 represents a fragmentary elevation of a part of a valve member;

Fig. 10 is a view similar to Fig. 9 showing a modified form of valve member;

Fig. 11 represents a fragmentary section along the plane indicated by the line 11—11, Fig. 9;

Fig. 12 represents a fragmentary edge view of the part of the valve member shown in Fig. 10 in the direction of the arrows 12—12 of that figure;

Fig. 13 shows in detached elevation an eccentric shaft in a medial position in which the eccentrics are in an intermediate position, as shown in Fig. 14;

Fig. 14 represents an end view of the eccentric shaft with the eccentrics located in an intermediate position, as shown in Fig. 13;

Figs. 15 and 18 show ports of a somewhat different shape from the corresponding ports of Figs. 1 to 14; and Figs. 16 and 17 show other ports which correspond to the ports shown in Figs. 1 to 14.

Reference will now be made in greater detail to the annexed drawings for a more detailed description of this invention. An eccentric shaft 1 is mounted in a housing 2 made up of cooperating parts 3 and 4 which are connected together in substantially fluid-tight relation. The eccentric shaft 1 is provided with a pair of eccentrics 5 and 6 arranged in opposing phases, that is, when one eccentric is directed upwardly, the other is directed downwardly, whereby to cause the pistons 7 and 8 to operate in opposite phases.

The sections 3 and 4 of the housing 2 are formed with a space 9 between them for the reception of a rotary valve member 10 provided with ports 11 which are equidistant from each other around the axis of the shaft 1. There are a plurality of cylinders 12, preferably three in number, as shown in Fig. 4, spaced equally about the axis of the shaft 1, in alignment with the medial plane of the eccentric 5, so that, as the shaft 1 rotates, the eccentric 5 will force first one piston 7 outwardly toward the cylinder head and then the next piston, and so on around, piston after piston, in accordance with the rotation of the shaft. An identical set of cylinders 14, in alignment with the cylinders 12, lengthwise of the shaft, are spaced longitudinally of the shaft and in alignment with the cylinders 12 so that the cylinders 12 and 14 are arranged in pairs. In the cylinders 14 are arranged pistons 8 substantially identical with the pistons 7, and these cylinders 12 and 14 are connected through ports 19, 11, and 20, as shown clearly in Fig. 2. The ports 19 and 20 extend diagonally outwardly from the ports 11 to the outer ends of the cylinders 12 and 14, and it is therefore clear that, when the shaft 1 rotates, an eccentric 5 pushes the pistons 7 upwardly toward the heads of the cylinders 12, and the fluid, preferably oil, contained within the cylinders 12, will be forced outwardly, sequentially, from the cylinders through the ports 19, provided the ports 11 are in alignment with the ports 19. This fluid, passing through ports 19 and 11, will pass through the aligned ports 20 and into the cylinders 14, forcing the pistons 8 inwardly. It also follows that, as the eccentrics 6 turn upwardly with the shaft 1, the pistons 8 will be forced upwardly to force the fluid in the cylinders 14 out through the ports 20, 11, and 19 into the cylinders 12. Hence, there is a flow back and forth between the cylinders 12 and 14. The rate of this flow is dependent partly upon the rate of rotation of the shaft 1 and partly upon the degree of alignment of the ports 11 with the ports 19 and 20.

The valve member 10 has a flange 21 which is provided around its periphery with gear teeth 22 which may be used in rotating the valve member 10 to change the degree of alignment of the ports 11 with the ports 19 and 20, resulting in a minutely varying change of carrying capacity of the ports connecting the cylinders. Changing the rate of flow of this fluid changes the rate of reciprocation of the pistons 7 and 8 and, consequently, resistance to the rate of rotation of the shaft 1. If the shaft 1 be a driving shaft, then the rate of driving is decreased or increased in accordance with alignment of the ports 11 with the communicating ports 19 and 20, and a corresponding change in the driving force transmitted to the driven object.

For example, if the body or housing 2 is a fixed body and the rate of rotation of the shaft 1 therein is to be decreased, then the valve member 10 will be rotated so that alignment of the ports 19, 11, and 20 will be reduced, and this will decrease the rate of flow of fluid between the cylinders 12 and 14 with a comparable decrease in the rate of reciprocation of the pistons 7 and 8 and decrease in the rate of rotation of the shaft 1.

Let us suppose that the housing 2 is attached to the power unit of an automotive vehicle and that the valve member 10 is so arranged that the ports 19, 11, and 20 are in complete alignment, then there is no resistance to the flow of fluid between the cylinders, and no power is transmitted to the driven eccentric shaft 1 and no driving occurs. Now, as the valve member 10 is rotated, there is less alignment between the ports 11 and the ports 19 and 20 and, consequently, there is a decrease in the rate of flow of the fluid back and forth between the cylinders 12 and 14, resulting in driving force being exerted on the shaft 1. When the valve member 10 is rotated to a point such that the ports 11 are completely out of line with the ports 19 and 20, then there can be no flow of fluid between any one of the cylinders 12 and its mating cylinder 14, and direct drive of the shaft 1 results.

Seals 23 around the shaft 1 retain the oil or grease in the compartment 24 in which the shaft 1 and the eccentrics 5 and 6 are housed. The presence of lubrication in this chamber tends to keep the moving parts lubricated at all times and to reduce wear to a minimum. As shown in Figs. 7 and 8, I prefer to have the eccentrics 5 and 6 case-hardened to reduce wear on the faces of the eccentrics. As shown in these figures, the pistons 7 and 8 are provided with peripheral grooves in which are piston rings 25 which, as shown in Fig. 7, may be arranged in laterally abutting pairs or, as shown in Fig. 8, may be individually arranged. Within these pistons are other pistons 26 which have longitudinally extending lateral grooves 27 to permit passage of fluid into and out of the space 28 between the heads of the pistons 7 and 8 and the head of the piston 26.

A longitudinally extending cavity 29 extends inwardly from the head of the piston 26 nearly to the opposite end thereof, and from this cavity 29 extends a vent 30 to the adjacent face of this piston. Longitudinally slidable in the cavity 29 is a headed pin 31, the head 32 of which bears against the inner face of the piston 7 or 8, being held in this position by a pair of "Belleville" springs 33 separated by a flat washer 34. The only difference between the structures of Figs. 7 and 8 is the spacing of the piston rings 25.

The ports 11 of Figs. 5 and 6 are shown more clearly in Figs. 9 and 11. In the structure shown in Fig. 16, the ports 33, 34, and 35 are graduated in size and replace the ports 11. By reason of the graduation in size, the rate of flow of the fluid from one cylinder to the other is changed in varying amounts as the valve member 10 is rotated. The same is true of the structure shown in Fig. 17 in which the openings 36, corresponding to the ports 11, are varied in carrying capacity by being tapered from one end to the other.

At the inner end, the section 4 of the housing 2 is provided with a flange 37 which defines the outer limit of the cavity 24 and which fits closely in a socket in the inner face of the section 3, the outer face of the flange 37 forming a seat for the valve member 10 which rides on this flange as it is rotated.

Hardened sleeves or liners, such as shown in Fig. 2, may be used in any of the cylinders to render easier the repair of the machine.

While I have referred to the shaft 1 as being rotatable, it is to be understood that either the shaft or the housing may be stationary and the other rotatable.

It will of course be understood that departures from the structure described above may be made without departing from the spirit of this invention as disclosed in this specification and as defined by the appended claims.

Having now described my invention, I claim:

1. A structure for the purposes indicated comprising a body member having a shaft opening therein and a flange around one end of the opening and projecting from the face of the body member, a second body member having a socket in one face thereof receiving the end of the flange tightly with a space between said body members radially outwardly of said flange, the second body member having an eccentric-receiving shaft opening coaxial with the first opening, and forming therewith a single opening, said body members having cylindrical openings extending radially from the shaft opening perpendicularly to the axis thereof and arranged in pairs having a common axial plane with the axis of the shaft opening, said body members also having ports leading from said cylindrical openings into said space, a valve member in said space between said body members and movable therein to control the flow of fluid from one cylinder opening through the associated ports to the other cylinder opening in the same axial plane, an eccentric shaft in said shaft opening, eccentrics on said shaft in alignment with the cylinder openings, and pistons in said cylinder openings, the pistons in any one of said pairs being simultaneously reciprocable in opposite directions.

2. A force-transmitting mechanism comprising a rotatable shaft having eccentrics spaced longitudinally of the shaft, a body surrounding the shaft and having a cavity therein in which said shaft is rotatable, said cavity being of a size to permit free rotation of said eccentrics, said body having cylindrical openings therein, arranged in pairs and in planes substantially perpendicular to the axis of the shaft, said cylindrical openings extending radially with relation to the shaft, pistons in said openings and reciprocable therein, said body having an annular recess situated between said cylinders, other openings connecting the ends of said cylindrical radial openings remote from the shaft with the sides of said recess, and a rotary valve member located in said recess and provided with ports to connect said other openings in pairs for the passage of fluid from one cylindrical opening of each pair to the other cylindrical opening of that pair, rotation of said valve member varying the carrying capacity of said other openings for fluid passing between said cylindrical openings.

3. A force-transmitting mechanism comprising a rotatable shaft having eccentrics spaced longitudinally of the shaft, a body surrounding the shaft and having a cavity therein in which said shaft is rotatable, said body having a plurality of cylinders therein substantially perpendicular to the axis of the shaft and arranged in the same plane, pistons in said cylinders and being caused to move longitudinally thereof, in one direction, by one of the eccentrics, another set of cylinders and pistons arranged in line with the other eccentric, an annular recess lying between said sets of cylinders and pistons, passageways leading in an approximately axial direction into said recesses from the radially outer ends of said cylinders, and a rotatable valve member arranged in said recess between the two sets of cylinders and pistons and having ports therein communicating with said approximately axially extending passageways for use in connecting adjacent cylinders in planes extending longitudinally of said shaft, said valve member being rotatable in said annular recess for varying the carrying capacity of the openings between said adjacent cylinders.

4. A hydraulic transmission apparatus comprising a housing member having a pair of cylinders positioned adjacent one another, a shaft rotatable in said housing, pistons movable in said cylinders, a driving connection between said shaft and each piston, said driving connections being arranged so that, when one piston is moved in one direction by rotation of said shaft in said housing, the other piston is moved in the other direction, fluid passage means interconnecting said cylinders, valve means controlling the flow of fluid through said passage means, said fluid substantially filling said cylinders and said passage means, and each of said pistons including yieldable means compensating for changes in volume of the fluid and receiving the associated driving connection and thereby providing for movement of said pistons in said cylinders under conditions in which said fluid is expanded volumetrically, said yieldable means including a pair of interconnected pistons with springs therebetween.

5. A hydraulic transmission apparatus, as defined by claim 4, in which said yielding means includes a spring in the head of piston, an auxiliary piston movable in the head of each piston, an auxiliary piston movable in each main piston against the action of the associated spring, fluid conduit means extending between the space between the inner end of each auxiliary piston and the inner portion of the associated main piston, the associated driving connection being connected with the auxiliary piston.

6. A structure for the purpose indicated, comprising a pair of body members connected together with a diametrically reduced portion at the junction between said members, there being a space around said reduced portion, adjacent walls of said members lying substantially in parallel spaced-apart planes, each of said body members having an eccentric-receiving shaft opening substantially coaxial with said reduced portion, said body member having cylindrical openings extending radially from the shaft opening perpendicularly to the axis thereof and arranged in pairs having a common axial plane with the axis of said shaft openings, said body members having ports leading from said cylindrical openings into the space about said reduced portion, a ported valve member positioned in said space and fitting against said walls in substantially leak-tight relation, said valve member being movable between said walls and about said reduced portion to control the flow of fluid from one cylindrical opening to the adjacent cylindrical opening, an eccentric shaft in said shaft opening, eccentrics on said shaft in alignment with the cylinder openings, and pistons in said cylinder openings, the pistons in any one of said pairs being simultaneously reciprocable in opposite directions.

GUSTAF ARTHUR ARVIDSON.

REFERENCES CITED

The following references are of record in the file of this patent:

UNITED STATES PATENTS

| Number | Name | Date |
|---|---|---|
| 1,444,423 | Miller | Feb. 6, 1923 |
| 1,964,679 | Springfield | June 26, 1934 |
| 2,228,799 | Watkins | Jan. 14, 1941 |
| 2,442,999 | Ekleberry | June 8, 1948 |